UNITED STATES PATENT OFFICE.

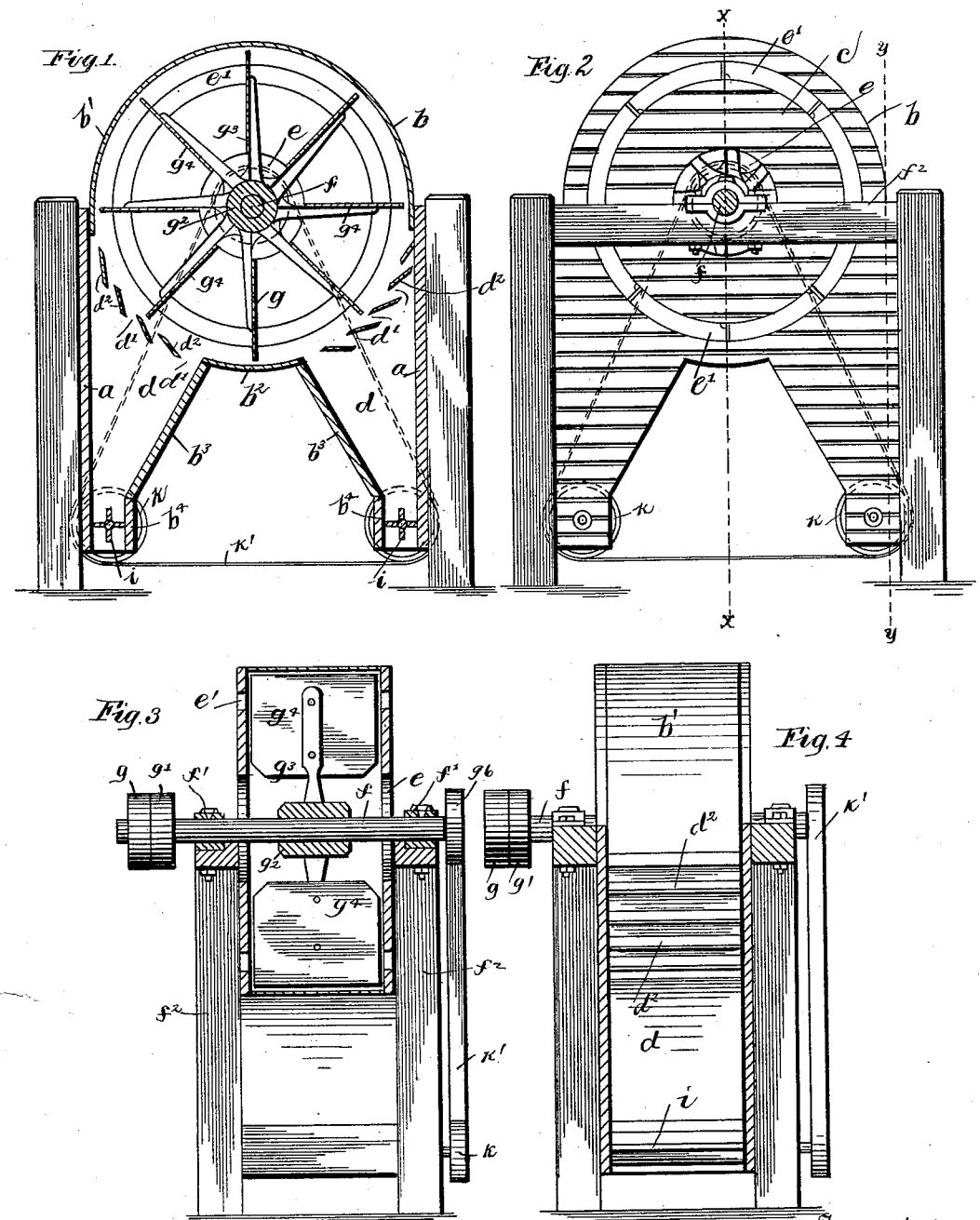

ALLEN C. BRANTINGHAM, OF COLUMBUS, OHIO.

DUST-COLLECTOR.

SPECIFICATION forming part of Letters Patent No. 469,646, dated February 23, 1892.

Application filed June 19, 1891. Serial No. 396,796. (No model.)

*To all whom it may concern:*

Be it known that I, ALLEN C. BRANTINGHAM, a citizen of the United States, residing at Columbus, in the county of Franklin and State of Ohio, have invented a certain new and useful Improvement in Dust-Collectors, of which the following is a specification.

My invention relates to the improvement of dust collectors and separators of that class adapted for use in connection with flour-milling machinery, and has particular relation to the improvement of the construction shown in my former application, Serial No. 386,720, filed March 27, 1891; and the objects of my invention are to provide an improved dust collector and separator of this class of such construction and arrangement as to greatly facilitate the separation of the dust from a dust-ladened current of air and to provide a superior form of casing for the fan, and improved means for trapping the dust from said casing. These objects I accomplish in the manner illustrated in the accompanying drawings, in which—

Figure 1 is a central sectional view of my device. Fig. 2 is an end view thereof. Fig. 3 is a central sectional view taken on line $x\ x$ of Fig. 2, and Fig. 4 is a sectional view on line $y\ y$ of Fig. 2.

Similar letters refer to similar parts throughout the several views.

$a$ represents the vertical side walls of my machine, between the upper portions of which is supported a cylindrical fan-case $b$. This fan-case consists of a half-cylindrical upper plate $b'$, which bridges the upper portions of the side walls $a$ and forms the upper wall portion of the fan-case. Beneath the center of the fan-case, and in the same arc of a circle described by the plate $b'$, is a bottom plate $b^2$, which, as shown, forms a segment of the casing $b$, and which is supported upon two laterally-inclined walls $b^3$, which extend between the end walls $c$ of the machine, said end walls inclosing the ends of the fan-case and frame-walls $a$. These walls $b^3$ diverge from the longer edges of the bottom plate $b^2$ and extend to points opposite the lower portions of the walls $a$, from which they are continued downward by short vertical extensions $b^4$. As shown in the drawings, the spaces between the walls $b^3$ and $a$ form passages, (indicated at $d$,) which communicate with the interior of the fan-case on opposite sides of the bottom plate $b^2$. The openings $d'$ through which this communication is produced are partially filled by downwardly and inwardly inclined skimming plates or strips $d^2$, which are separated from each other and arranged in the same arc of a circle described by the plates $b'\ b^2$. Formed in each of the end walls $c$, opposite the center of the fan-case, is a central opening $e$, and about each of said openings $e$, near the peripheral wall of the fan-casing, is formed in each of said end walls a circular opening $e'$. Through the central openings $e$ and through the center of the fan-casing passes a fan-shaft $f$, the outer projecting end portions of which are journaled in suitable boxings $f'$, supported upon the frame-work $f^2$ on the outer side of the machine. One of the outer ends of this shaft $f$ carries loose and tight pulleys $g\ g'$. Mounted upon the shaft $f$ within the fan-case is the hub $g^2$ of a fan $g^3$, the vanes $g^4$ of which extend past the wall-openings $e'$ to within close proximity of the peripheral wall $b$. In the lower portion of each of the passages $d$ is journaled a dust-roll $i$, the shaft of which bears in the end walls $c$, two corresponding ends of these dust-roll shafts carrying, as shown, belt-wheels $k$, which are connected by a belt $k'$ with a pulley $g^6$ of the fan-shaft.

The operation of my device is as follows: The rotation of the fan-shaft and its fan will result in a suction of the dust-ladened air through the central openings $e$ about said shaft, which is driven by the vanes of the fan against the inner surface of the peripheral wall of the fan-casing. The dust or heavier particles contained in the dust-ladened current following the plate $b'$ will be caught or skimmed from the air-current by the plates $d^2$ and blown by the action of the vanes through the opening $d'$ between said plates into the passage $d$. From said passage the dust will be trapped out by the rotating rolls $i$. The purified air, which is separated, as above described, from the dust or heavier impurities, escapes from the fan-case through the openings $e'$.

Having now fully described my invention, what I claim, and desire to secure by Letters Patent, is—

1. In a dust-collector, the combination, with the fan-casing, oppositely-located central air-openings $e$, opening $e'$ near the periphery of the fan-case, and a rotating fan within said case, of dust-passages $d$, diverging from opposite sides of said fan-case and communicating therewith, and rotating dust-rolls in the lower portions of said passages, substantially as and for the purpose specified.

2. In a dust-collector, the combination, with the fan-case, central air-inlet openings $e$ and outlet-openings $e'$, arranged as described, a rotating fan within said case, and dust-discharge passages diverging from opposite sides of said fan-case and communicating therewith, of inclined skimming-plates $d^2$, arranged, as described, between said dust-passages and fan-case, substantially as and for the purpose specified.

ALLEN C. BRANTINGHAM.

In presence of—
C. C. SHEPHERD,
BARTON GRIFFITH.